United States Patent
Nordling et al.

(10) Patent No.: US 7,133,497 B2
(45) Date of Patent: Nov. 7, 2006

(54) USE OF LOWER BANDWIDTH TECHNOLOGY TO DETERMINE CHANNEL CAPABILITY FOR SUPPORTING HIGHER BANDWIDTH TECHNOLOGY

(75) Inventors: Karl I. Nordling, Raleigh, NC (US); Vedavalli G. Krishnan, Raleigh, NC (US); Mandayam G. Krishnan, Raleigh, NC (US); Fred Schuckert, Redwood City, CA (US); Wesley H. Smith, Raleigh, NC (US); Don Carmon, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 10/112,275

(22) Filed: Mar. 29, 2002

(65) Prior Publication Data

US 2004/0086085 A1    May 6, 2004

(51) Int. Cl.
*H04M 1/24* (2006.01)
*H04M 3/08* (2006.01)
*H04M 3/22* (2006.01)
*H04L 1/00* (2006.01)
*H04L 12/26* (2006.01)

(52) U.S. Cl. .................. 379/1.04; 379/1.01; 379/1.03; 379/22; 370/241; 370/252

(58) Field of Classification Search .............. 379/1.01, 379/1.03, 1.04, 21, 22, 23, 24, 27.01, 29.01; 370/241, 250, 252, 253; 375/224, 225, 229, 375/231, 242
See application file for complete search history.

(56) References Cited

U.S. PATENT DOCUMENTS

| | | | |
|---|---|---|---|
| 6,205,202 B1 * | 3/2001 | Yoshida et al. | 379/27.02 |
| 6,370,230 B1 * | 4/2002 | Sellman | 379/22.04 |
| 6,385,297 B1 * | 5/2002 | Faulkner et al. | 379/1.04 |
| 6,445,773 B1 * | 9/2002 | Liang et al. | 379/1.04 |
| 6,466,647 B1 * | 10/2002 | Tennyson | 379/1.04 |
| 6,477,238 B1 * | 11/2002 | Schneider et al. | 379/22.04 |
| 6,549,587 B1 | 4/2003 | Li | |
| 6,570,912 B1 | 5/2003 | Mirfakhraei | |
| 6,671,312 B1 | 12/2003 | Lanier et al. | |
| 2002/0034220 A1 | 3/2002 | Duxbury | |

* cited by examiner

*Primary Examiner*—Quoc Tran
(74) *Attorney, Agent, or Firm*—Blakely, Sokoloff, Taylor & Zafman LLP (57) ABSTRACT

Lower bandwidth technology is used to determine whether a communication channel can support higher bandwidth technology. A signal generator generates a series of test signals that are associated with the higher bandwidth technology. The test signals are sampled to produce aliases that can be analyzed with lower bandwidth technology. Modem parameters are accessed from a modem's memory. The modem parameters are compared with a database containing information about whether a set of modem parameters indicates that a telephone local can support broadband devices.

27 Claims, 9 Drawing Sheets

USE OF LOWER BANDWIDTH TECHNOLOGY TO DETERMINE CHANNEL CAPABILITY FOR SUPPORTING HIGHER BANDWIDTH TECHNOLOGY

FIELD

This invention relates to telephone networks and more specifically to the use of lower bandwidth technology to determine channel capability for supporting higher bandwidth technology.

BACKGROUND

Telephone networks are generally designed to support voice-band communication. The voice-band is the range of frequencies that is generally audible and is used for the transmission of speech. The voice-band ranges from approximately 300 Hz to 4000 kHz.

Figure 1:
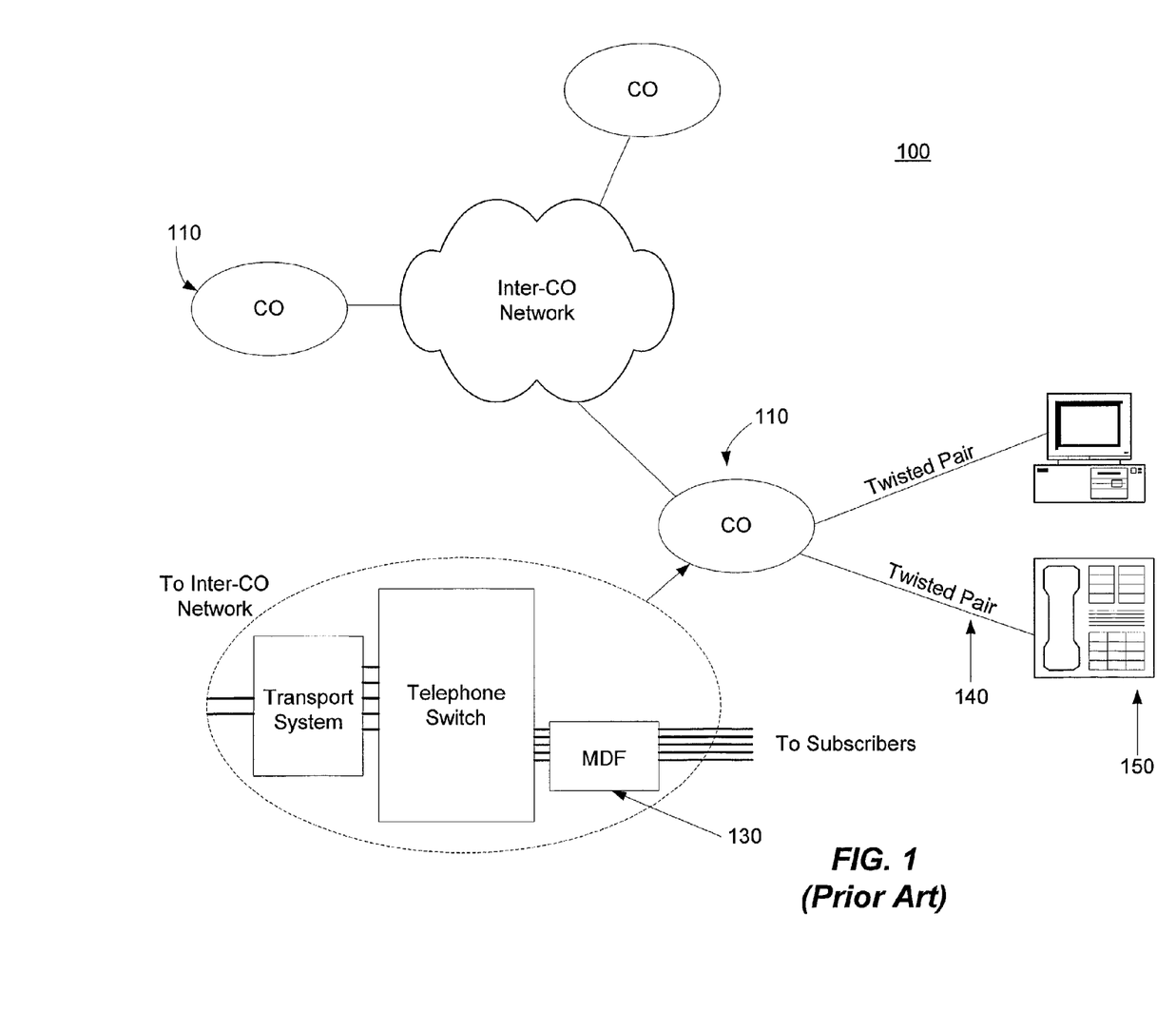
FIG. 1 is a conceptual illustration of telephone network 100.

FIG. 1 shows telephone network 100. Central Offices (COs) 110 connect to individual subscribers through a main distribution frame (MDF) 130. A twisted pair of copper wires 140 typically connects an MDF 130 to a subscriber 150. The copper wire connection between MDF 130 and subscriber 150 is called a local loop (or a telephone loop). Local loops are generally designed for voice-band communication.

Broadband technology uses frequencies that are much higher than the voice-band. Digital subscriber line (DSL) technology, for example, uses frequencies that typically range from approximately 25 kHz. to approximately 1.1 MHz. Because local loops are designed for the voice-band, not all local loops will support broadband services. In a typical telephone network, some local loops will support broadband services and some local loops will not support broadband services. Often, a telephone company does not know which local loops will support broadband services.

Typically, broadband service providers must determine which local loops are capable of supporting broadband services. It is expensive and labor intensive for service providers to send a technician to the home of an individual subscriber to test the subscriber's local loop. The process of qualifying local loops can be made much less expensive if a subscriber can be provided with the means to test her local loop.

A conventional means for testing whether a local loop can support broadband services employs information sequences exchanged between voice-band modems. During modem handshaking and training procedures, voice-band modems use voice-band signals to probe a local loop. These modems exchange information with each other through signals called information sequences. The information sequences contain a summary description of the channel capacity of the loop at various voice bands along with certain characteristics of the connection that was derived by the modems during handshaking and training. Estimations about the capacity of a local loop to support broadband services can be based on these information sequences.

Conventional loop testing methods do not access all of the information that modems derive during handshaking and training procedures. Also, conventional loop testing methods probe a local loop with test signals that have frequencies that are limited to the voice-band. Thus, conventional loop testing methods use test signals with a limited range of frequencies and do not employ all of the information generated by those test signals.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for using lower bandwidth technology to determine channel capability for supporting higher bandwidth technology are described in detail herein. In the following description, numerous specific details are provided in order to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 2:
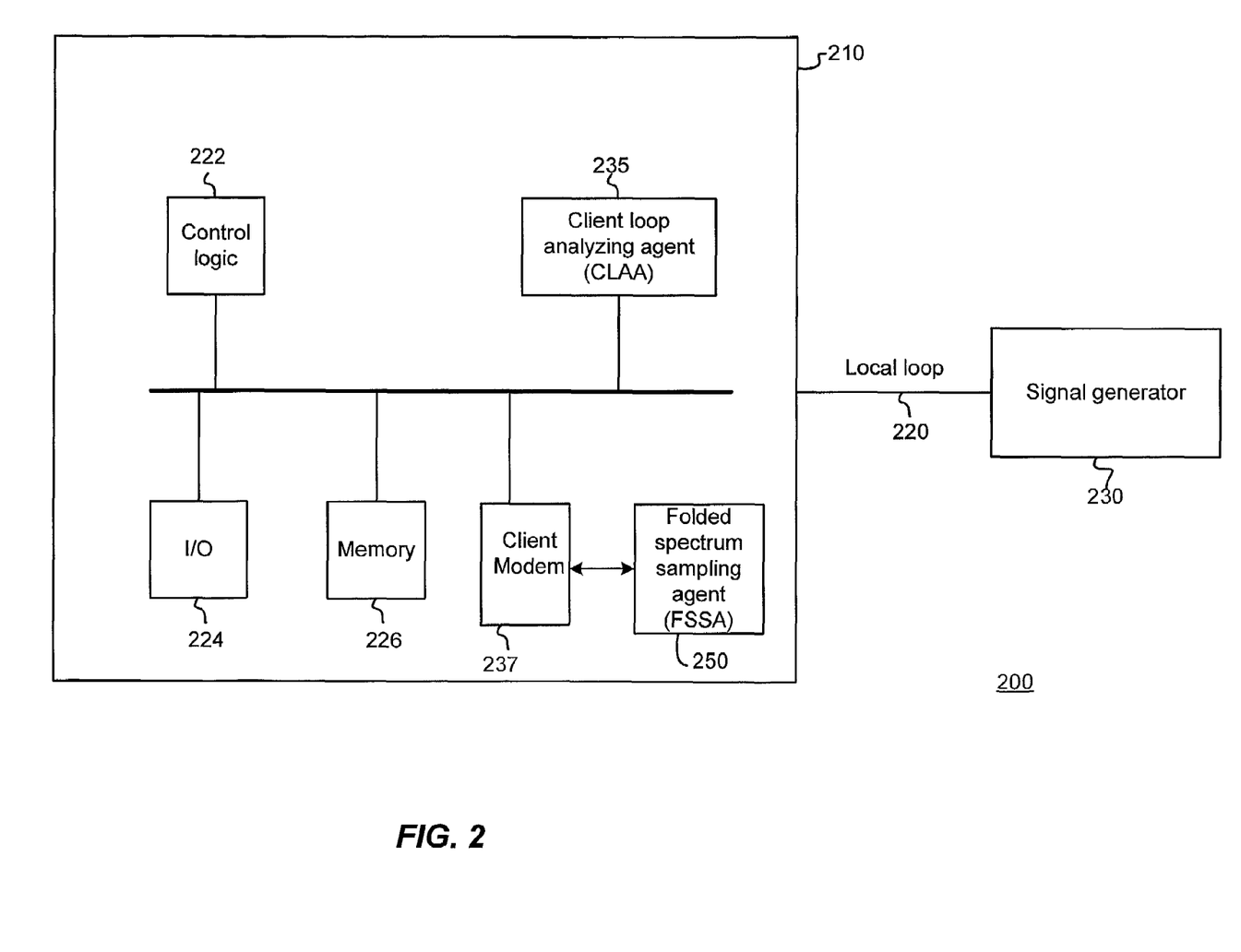
FIG. 2 is a block diagram of electronic system 200.

FIG. 2 is a block diagram of electronic system 200. Electronic system 200 includes computing device 210, local loop 220, and signal generator 230. Local loop 220 is typically a twisted pair of copper wires. Electronic system 200 provides one embodiment of a system and apparatus that uses lower bandwidth technology to determine whether local loop 220 can support higher bandwidth technology.

Signal generator 230 represents a broad class of devices that generate alternating current stimulus signals used to evaluate electrical and electronic systems. In one embodiment, signal generator 230 is a dedicated signal source capable of generating the test signals described below. In alternate embodiments, signal generator 230 is an item of general purpose test equipment capable of generating the test signals described below.

Signal generator 230 is coupled with computing device 210 through local loop 220. In an embodiment of the invention, signal generator 230 generates a sequence of test signals that allow client loop analyzing agent 235 to determine a number of broadband characteristics of local loop 220. In one embodiment of the invention, signal generator 230 is a piece of test equipment that connects to local loop 220. In one embodiment of the invention, signal generator 230 is located with a customer's premises equipment (CPE). In alternate embodiments of the invention signal generator 230 is located in a central office (CO). In another embodiment of the invention, signal generator 230 is part of a digital subscriber line access multiplexer (DSLAM) to which computing device 210 connects. Signal generator 230 is a wideband transmitter.

Signal generator 230 generates a series of test signals having frequencies greater than 4 kHz. In one embodiment of the invention, the test signals are a sequence of carrier signals spaced approximately 4.3125 kHz apart. An exemplary sequence of test signals has the following frequencies: N*4.3125 kHz, (N+1)*4.3125 kHz, (N+2)*4.3125 kHz, 250*4.3125 kHz. In other embodiments of the invention, a different sequence of test signals is used.

Each test signal is modulated with a spreading signal, in an embodiment of the invention, so that the spectrum of each test signal is spread to approximately 4 kHz. An embodiment of the invention that employs 256 test signals that are each 4.3125 kHz wide is able to test local loop 220 across a bandwidth of approximately 1.1 MHz. Thus, signal generator 230 tests the frequency response of local loop 220 across the entire range of frequencies that is typically employed in broadband technology.

In one embodiment, computing device 210 includes: control logic 222, memory 226, one or more input/output (I/O) units 224, modem 237, client loop analyzing agent (CLAA) 235, and folded spectrum sampling agent (FSSA) 250. These blocks are coupled to each other by one or more buses. An input device, such as a keyboard, mouse, stylus, etc., is used to input data into the computer system through an I/O unit. The inputted data can be stored in memory 226. Control logic 222 receives the data stored in memory 226 and processes the data as directed by a set of instructions. The results can be stored back into memory 226. Also, the results can be outputted through the I/O unit to an output device such as a printer, cathode-ray tube (CRT) display, etc.

In one embodiment of the invention, CLAA 235 is embodied as control logic, for example, an application specific integrated circuit (ASIC), programmable logic array (PLA), field programmable gate array (FPGA), controller, etc. In another embodiment, CLAA 235 is executable content. CLAA 235 is stored in memory 226, in some embodiments. In alternate embodiments, client loop analyzing agent (CLAA) 235 is an element of client modem 237. CLAA 235 is more fully described below in connection with FIG. 4.

In one embodiment, modem 237 is a modem capable of implementing the International Telecommunication Union—Telecommunication Standardization Sector recommendation V.90 (09/98) entitled, "A Digital Modem and Analogue Modem Pair for Use on the Public Switched Telephone Network (PSTN) at Data Signalling Rates of up to 56,000 bits/s downstream and up to 33,600 bit/s Upstream" (V.90 Standard). Modem 237 is not required, however, to comply with the V.90 Standard and can be any modem that engages in handshaking and training procedures. In an alternate embodiment of the invention, test signals are received by a receiver that is designed to be compatible with the test sequences generated by signal generator 230.

Folded spectrum sampling agent (FSSA) 250 employs sampling, aliasing, and frequency folding to enable modem 237 to process the received test signals generated by signal generator 230. The test signals generated by signal generator 230 are continuous signals. FSSA 250 employs sampling to convent the continuous signals to discrete signals that can be processed in modem 327. Sampling continuous signals is well known in the art and will not be further described. For a more complete description of sampling see, for example, Bernard Skylar, *Digital Communications Fundamentals and Applications*, PTR Prentice Hall, 1988. In an embodiment of the invention, FSSA 250 samples the test signals at a sampling rate of 8.625 kHz. FSSA 250 includes a wideband sampler and the under sampled aliased wideband signal is used for processing.

When the sampling rate is less than twice the frequency of a test signal, sampling techniques produce signal frequency components that do not have the same frequency as the test signal. Aliasing refers to generating signal frequency components that do not have the same frequency as the test signal. For a further description of aliasing see, for example, Micheal O'Flynn, et al., *Linear Systems Time Domain and Transform Analysis*, John Wiley & Sons, Inc., 1987.

Frequency folding refers to signal frequency aliases that have a frequency that is less than the frequency of the test signal that generated the alias. Typically, a test signal with a frequency larger than the sampling rate generates an alias that has a frequency that is less than half of the sampling rate. The Nyquist frequency refers to the frequency that is half of the sampling rate. In an embodiment of the invention, the sampling rate is 8.625 kHz and the Nyquist frequency is 4.3125 kHz. Test signals with a frequency greater than 4.3125 kHz generate aliases that have a frequency less than 4.3125 kHz. Characteristics of the aliases depend on whether the test signals belong to the odd or even multiple band of the Nyquist frequency.

Figure 3A:
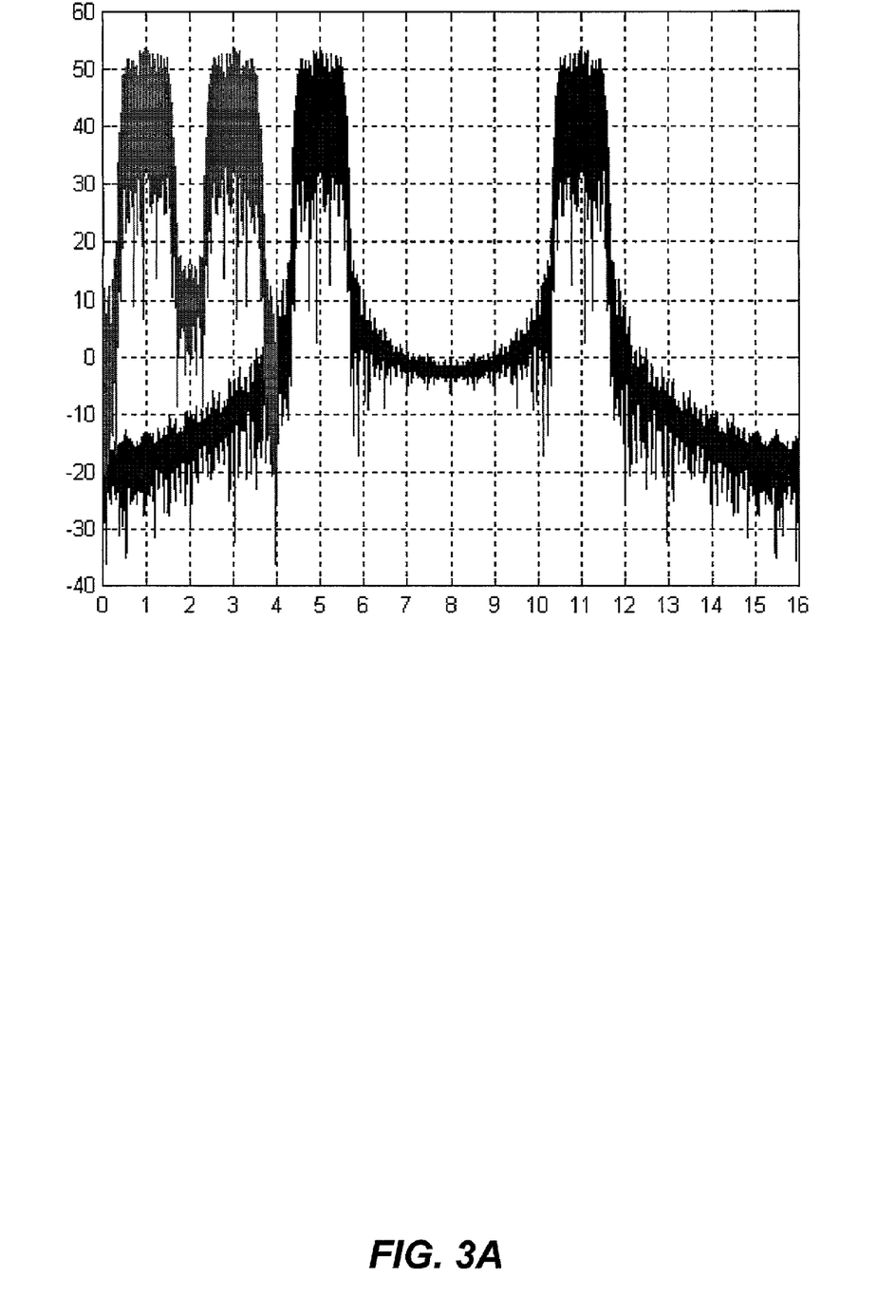
FIGS. 3A–3B illustrate the concept of spectrum aliasing.
Figure 3B:
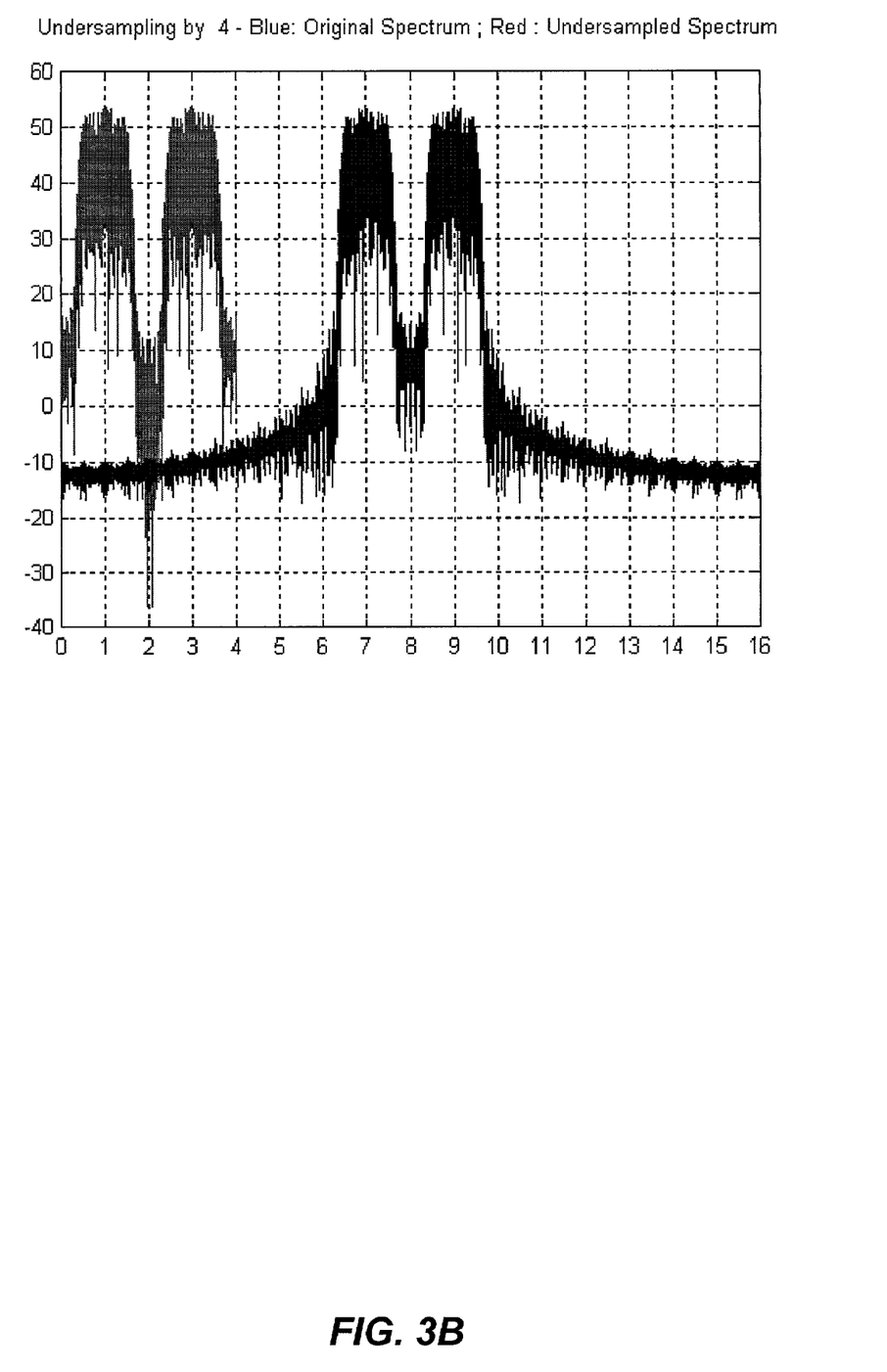

FIGS. 3A and 3B illustrate the concept of spectrum aliasing. The transmit sampling frequency in FIGS. 3A and 3B is sixteen and the transmit Nyquist band is eight. The transmit spectrum and its reflection about the Nyquist frequency are shown. The receive sampling frequency is four and the receive Nyquist frequency is two. In FIG. 3A, the transmit signal band is centered around five which maps to one in the receiver band. The transmit reflection is centered around eleven and maps to three in the receiver band. Thus, the receiver demodulates the signal and processes the baseband signal as though the transmitter band is one. In comparison, the transmit signal band shown in FIG. 3B is centered around seven and maps into three (the same as negative 1) in the receiver band. The transmit reflection, in FIG. 3B, is centered around nine and maps into one in the receiver band. Therefore, the receiver reverses the bands using remodulation and then processes the baseband signal as in the previous case.

Figure 3C:
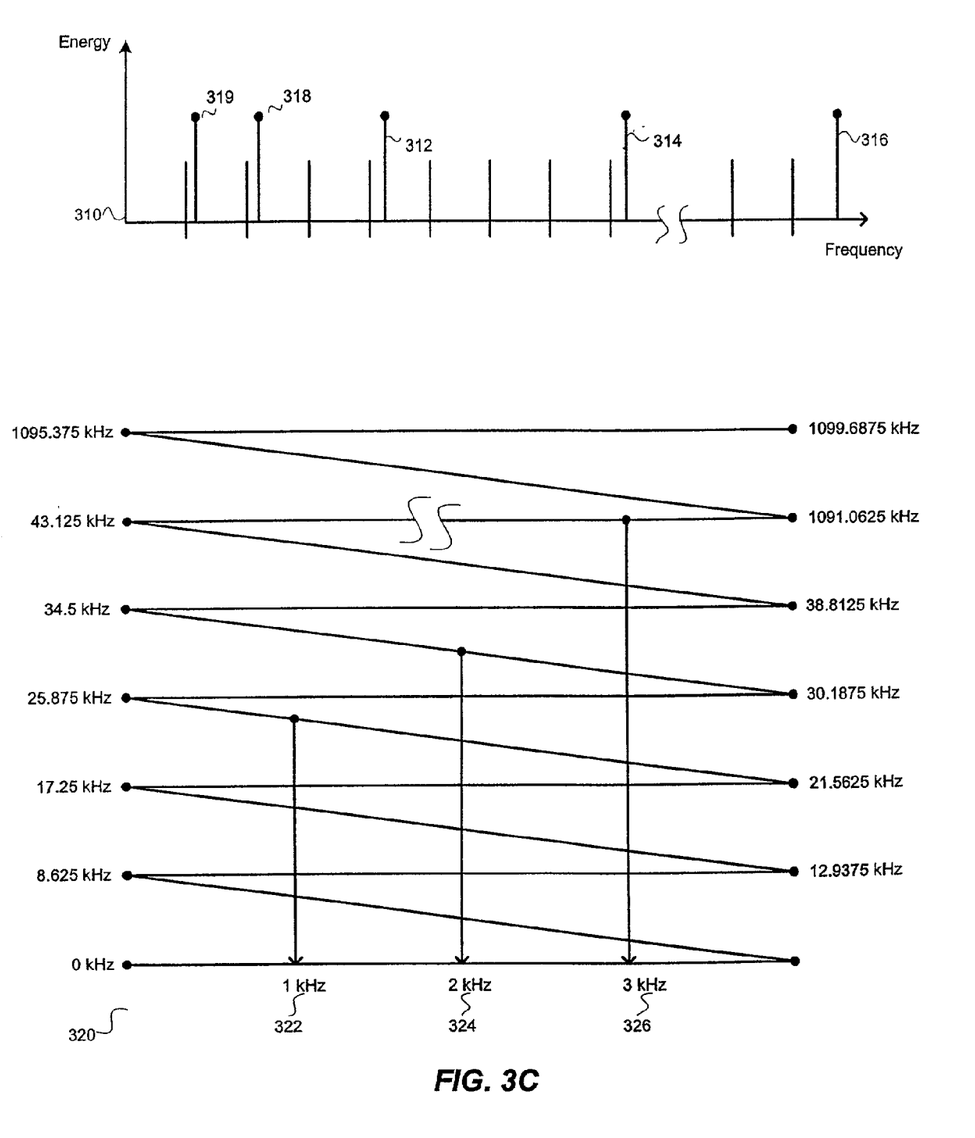
FIG. 3C is a frequency plot showing a sequence of test signals and a frequency folding diagram.

FIG. 3C is a frequency plot showing a sequence of test signals and a frequency folding diagram. Frequency plot 310 shows test signals 312, 314, and 316. Test signals 312, 314, and 316 have frequencies of 24.875 kHz, 32.5 kHz, and 1086.75 kHz respectively. Frequency plot 310 also shows sampling rate 318 and Nyquist frequency 319. In an embodiment of the invention, sampling rate 318 is 8.625 kHz and Nyquist frequency 319 is 4.3125 kHz.

Figure 7:
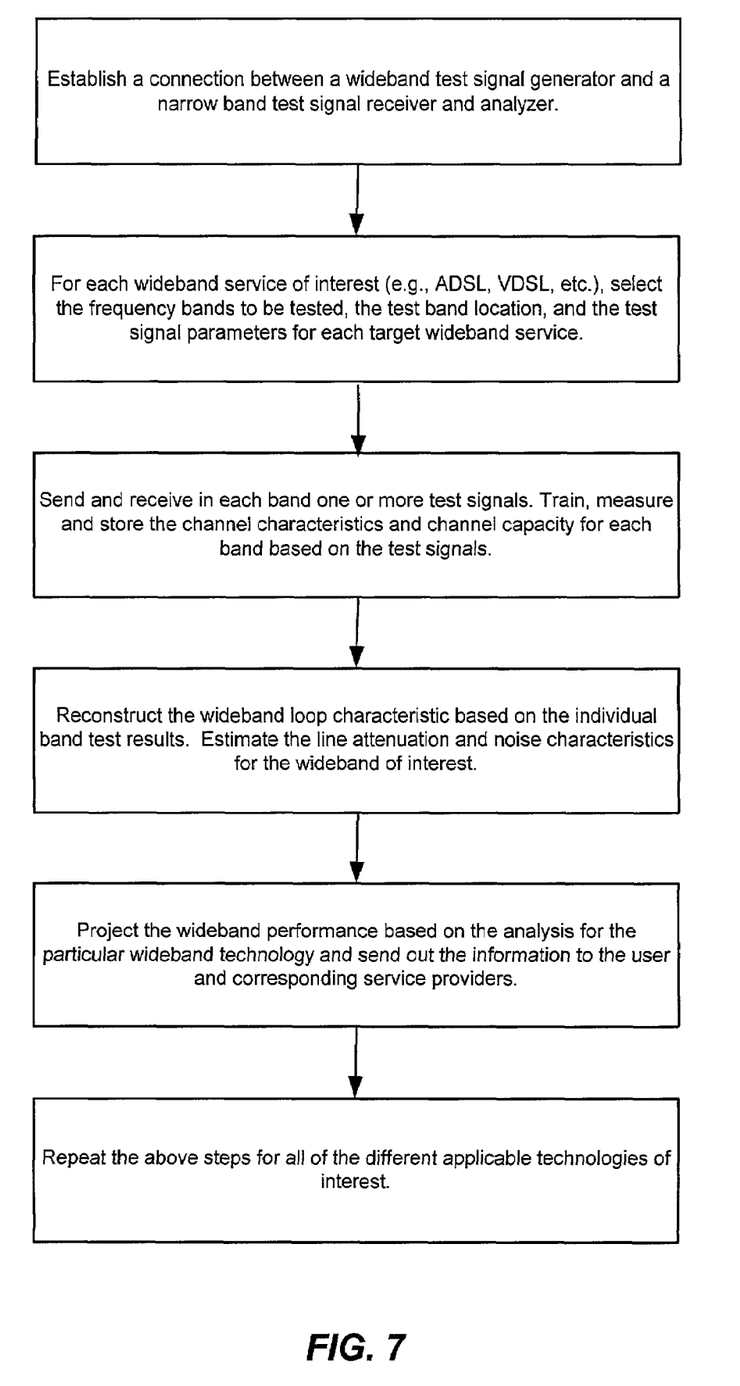
FIG. 7 is a conceptual flowchart illustrating how to determine the capacity of a communication channel to support higher bandwidth technology using lower bandwidth technology.

Frequency folding diagram 320 illustrates how the frequencies of test signals 312, 314, and 316 are folded down to less than the Nyquist frequency. For an embodiment of the invention with a sampling rate of 8.625 kHz, test signals with frequencies greater than 4.3125 kHz are folded down so that they have frequencies less than 4.3125 kHz. Reference numeral 322 shows that test signal 312 is folded down so that it has a frequency of 1 kHz. Test signal 314 is folded down so that it has a frequency of 2 kHz at 324. Similarly, test signal 316 is folded down so that it has a frequency of 3 kHz at 326. Thus, in an embodiment of the invention, MODEM 237 processes test signals in the voice-band even though they are transmitted at frequencies much higher than the voice-band. The received test signals represent the line distortions that correspond to the test signal frequencies. Based on the received test signals, a wideband line analysis can be performed, and channel capacity for a DSL connection can be estimated. While the examples disclosed herein show voice-band modems, in general the technique is applicable for determining higher bandwidth technology provisioning using an existing lower band technology. FIG. 7 illustrates determining the capacity of a communication channel to support higher bandwidth technology using lower bandwidth technology, according to an embodiment of the invention.

In one embodiment of the invention, FSSA 250 is embodied as control logic, for example, an ASIC, PLA, FPGA, controller, etc. In another embodiment, FSSA 250 is executable content. FSSA 250 is stored in a memory sub-system (not shown) of modem 237, in some embodiments. In an alternate embodiment of the invention, FSSA 250 is stored in a memory sub-system of client computing device 210.

Figure 4:
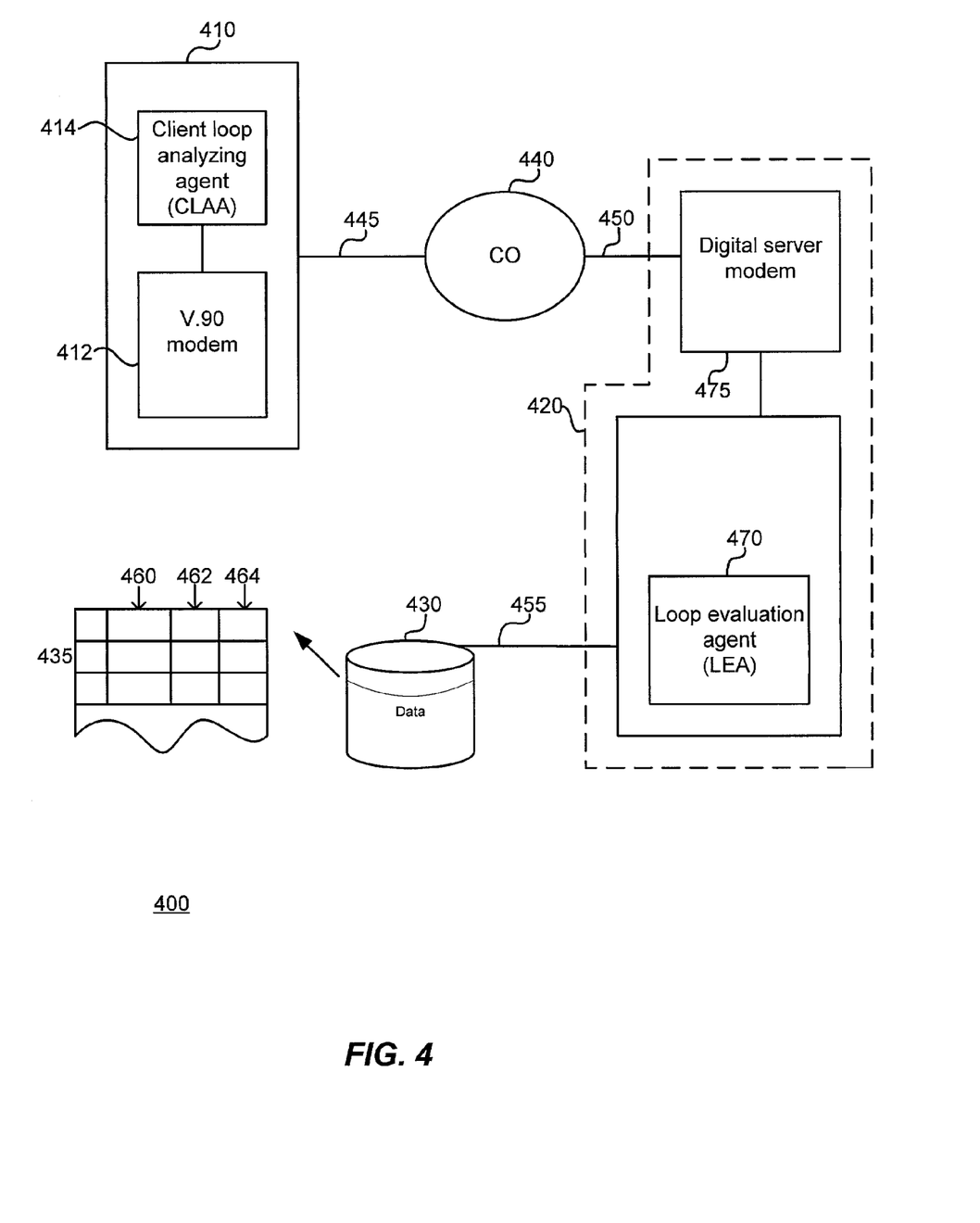
FIG. 4 is a block diagram of interconnected electronic systems.

FIG. 4 is a block diagram of interconnected electronic systems. FIG. 4 shows client computing device 410, server computing device 420, and test loop database 430. In an embodiment of the invention, client computing device 410 connects to central office (CO) 440 through local loop 445. Local loop 445 is the only analog connection between client computing device 410 and server computing device 420. CO 440 connects to server computer device 420 through digital line 450. In an embodiment of the invention, server computing device 420 is part of CO 440. Server computing device 420 connects to test loop database 430 through communication channel 455, in an embodiment of the invention.

Client computing device 410 includes modem 412 and client loop analyzing agent (CLAA) 414, in an embodiment of the invention. In one embodiment, modem 412 is compliant with the V.90 Standard. Modem 412 is not required, however, to comply with the V.90 Standard and can be any modem or test sequence that engages in handshaking and training procedures.

Client loop analyzing agent (CLAA) 414 controls the process of making a test call and collects line signal information into a file, in an embodiment of the invention. In some embodiments of the invention CLAA 414 directs modem 412 to employ various modulation modes and speeds when making a test call. CLAA 414 is also used to direct modem 412 to send special probing signals, in some embodiments of the invention.

Test loop database 430 contains test loop files 435 for a large number of test loops. In an embodiment of the invention, each test loop file 435 contains a field for test loop specification 460, DSL modem performance supported by the test loop 462, and modem parameters collected from the test loops 464. In alternate embodiments, test loop files 435 include a different selection of fields. The use of test loop database 430 is further described below.

In one embodiment of the invention, client modem 412 initiates a connection with server modem 475 over local loop 445. Client modem 412 and server modem 475 conduct handshaking and training procedures. Each modem generates a set of modem parameters during the handshaking and training procedures. The invention then proceeds in either a single-ended or double-ended mode.

According to the single-ended mode, loop evaluation agent (LEA) 470 accesses the modem parameters generated by server modem 475. LEA 470 organizes the modem parameters into a set of server matching criteria that can be compared with the entries in database 430. The entries in database 430 contain the results of testing a large number of test loops to determine the capacity of the test loop to support broadband services. Each entry in database 430 contains one or more sets of modem parameters with corresponding descriptions of a test loop's capacity to support broadband services. The server matching criteria is based on server modem 475's modem parameters.

LEA 470 compares the server matching criteria with the entries in database 430. The process of comparing the server matching criteria to the entries in database 430 is more fully described below in connection with FIG. 6. If an entry in database 430 matches the server matching criteria, the database entry's description of the test loop's capacity to support broadband services matches local loop 445's capacity to support broadband services.

In an alternate embodiment of the invention, LEA 470 and database 430 are located in client computing device 410. According to this embodiment of the invention, the single-ended mode involves creating a set of client matching criteria. The client matching criteria is compared with the entries in database 430. A match between the client matching criteria and an entry in database 430 provides a description of local loop 445's capacity to support broadband services.

In the double-ended mode, three sets of matching criteria may be generated: server matching criteria, client matching criteria, and difference matching criteria. CLAA 414 accesses client modem 412's modem parameters to create the client matching criteria. CLAA 414 sends LEA 470 the client matching criteria, in an embodiment of the invention. LEA 470 generates the server matching criteria.

LEA 470 generates the difference matching criteria, in an embodiment of the invention. In one embodiment of the invention, the difference matching criteria is generated by subtracting the client matching criteria from the server matching criteria. In alternate embodiments of the invention, the difference matching criteria is generated by subtracting the server matching criteria from the client matching criteria.

LEA 470 compares the three sets of matching criteria to the entries in database 430. In an embodiment of the invention, the entries in database 430 contain a field that corresponds to each of the three types of matching criteria. The entries in database 430 also include a field that describes the capacity of a particular test loop to support broadband services. If LEA 470 determines that one or more sets of matching criteria matches an entry in database 430, LEA 470 retrieves the data describing the test loop's capacity to support broadband services. Because the test loop's modem parameters match one or more of the sets of matching criteria, the capacity of local loop 445 to support broadband services matches the capacity of the test loop to support broadband services.

Figure 5:
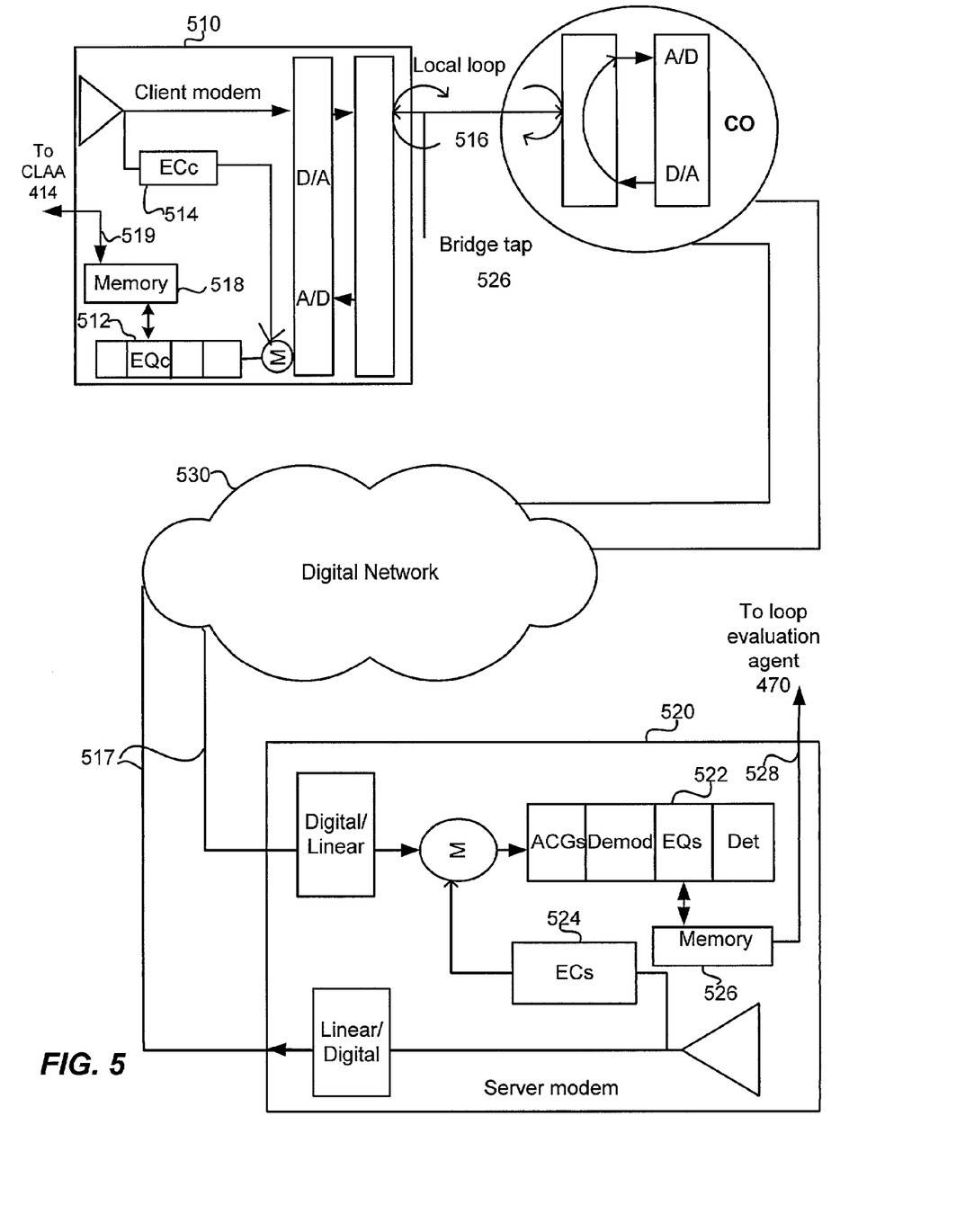
FIG. 5 shows elements of FIG. 4 in greater detail.

FIG. 5 shows selected elements of interconnected electronic systems in greater detail. FIG. 5 includes client modem 510, server modem 520, and digital network 530. Client modem 510 connects to digital network 530 through local loop 516. Similarly, server modem 520 connects with digital network 530 through communication channels 517.

Client modem 510 employs equalizer 512 and echo canceller 514, in an embodiment of the invention. During a training sequence, equalizer 512 generates a model of the frequency characteristics of local loop 516. Echo canceller 514 creates a model of the combined echo received from the modem front end and the connection with digital network 530. Equalizer 512 and echo canceller 514 store information about local loop 516 in memory 518. In one embodiment of the invention, CLAA 414 accesses memory 518 through communication channel 519. In alternate embodiments of the invention, CLAA 414 is an element of client modem 510 and communication channel 519 connects elements of client modem 510.

In an embodiment of the invention, memory 518 stores parameters associated with local loop 516 in addition to information associated with equalizer 512 and echo canceller 514. In an embodiment of the invention, memory 518 stores automatic gain control settings, precoder information, preemphasis selection, baud rate information, and power level information. Other parameters can also be determined and/or stored. FIG. 5 shows memory 518 as a single structure. In some embodiments of the invention, however, memory 518 includes a number of registers and static memory devices located throughout client modem 510.

In an embodiment of the invention, CLAA 414 accesses memory 518 and sends the parameters stored in memory 518 to loop evaluation agent (LEA) 470. In an alternate embodiment of the invention, LEA 470 resides on client computing device 410 and CLAA 414 resides on server computing device 420. In that embodiment of the invention, CLAA 414 accesses memory 526 and sends the server modem parameters to LEA 470.

Server modem 520 employs equalizer 522 and echo canceller 524, in an embodiment of the invention. The functions of equalizer 522 and echo canceller 524 are similar to the functions of equalizer 512 and echo canceller 514. Because equalizer 522 and echo canceller 524 are connected to the opposite end of local loop 516, as compared with client modem 510, the information they generate about local loop 516 will be different than the information that is generated by equalizer 512 and echo canceller 514.

For example, equalizer 512 and 522 both collect information about loading coil 526. The information collected by equalizer 512 will vary, however, from the information collected by equalizer 522 because equalizer 512 is much closer to loading coil 516 than is equalizer 522. Similarly, the echoes detected by echo canceller 514 and echo canceller 524 vary because each modem is on the opposite end of local loop 516. Therefore, the parameters client modem 510 stores in memory 518 are different than the parameters server modem 520 stores in memory 526.

In an embodiment of the invention, equalizer 522 and echo canceller 524 store information about local loop 516 in memory 526. Memory 526 also stores a number of other modem parameters including automatic gain control settings, precoder information, preemphasis selection, baud rate information, and power level information. Loop evaluation agent 470 accesses memory 526 through communication channel 528, in an embodiment of the invention.

Figure 6:
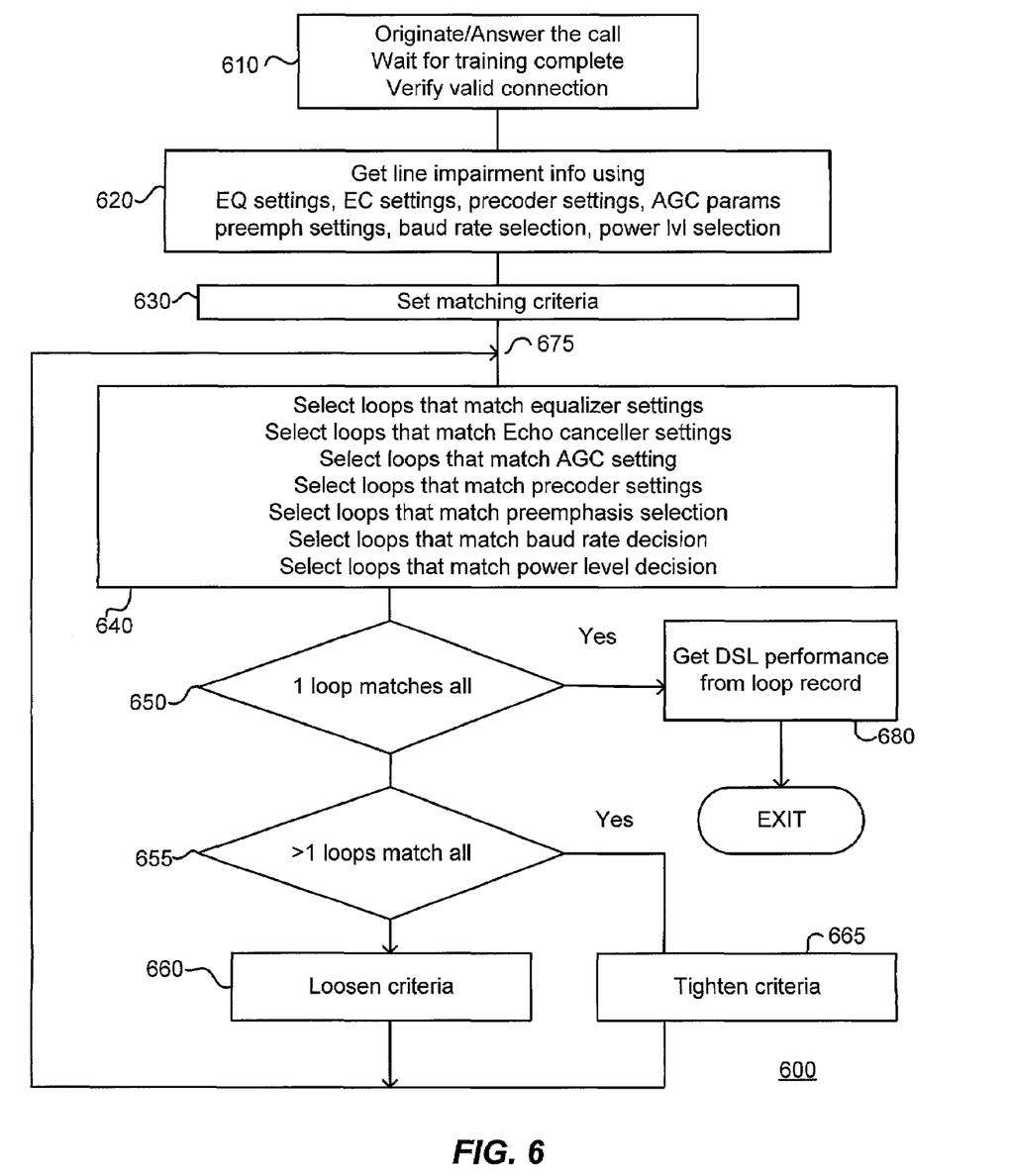
FIG. 6 Is a flow diagram illustrating the process of testing a local loop according to an embodiment of the invention.

FIG. 6 is a flow diagram illustrating process 600. Elements of FIG. 5 and FIG. 6 are referenced to help illustrate process 600. In an embodiment of the invention, loop evaluation agent (LEA) 470 employs process 600 to analyze local loop 445. LEA 470 initiates or answers a telephone call in block 610. In an embodiment of the invention, client computing device 410 initiates a telephone call to server computing device 420. In alternate embodiments, server computing device 420 contacts client computing device 410. In either case, server modem 475 implements a modem training procedure and verifies that it has established a valid connection with client modem 412.

LEA 470 collects a set of parameters from server modem 475 at block 620. In an embodiment of the invention, LEA 470 collects parameters generated during the modem handshaking and training procedures. LEA 470 accesses memory 526, in an embodiment of the invention, to obtain parameters stored in memory 526. Memory 526 contains information about the equalizer, echo canceller, automatic gain control, precoder, preemphasis, baud rate, and power level settings of the modem, in an embodiment of the invention.

In an embodiment of the invention, LEA 470 will not proceed to step 630 if the noise level parameter is too high. In alternate embodiments, LEA 470 gathers less or more information about local loop 445.

LEA 470 determines a set of matching criteria at block 630. The set of matching criteria is based on the parameters collected in block 620. In an embodiment of the invention, the set of matching criteria is a selected set of modem parameters that LEA 470 collected in block 620.

In block 640, LEA 470 compares the set of matching criteria generated in block 630 with the entries in test loop database 430. Test loop database 430 contains information generated by testing a large number of test loops with varying capacities to support broadband services. In an embodiment of the invention, each entry in test loop database 430 contains field 464. Field 464 contains a set of modem parameters associated with a particular test loop. In one embodiment of the invention, LEA 470 compares the matching criteria with field 464 of each entry in test loop database 430. In alternate embodiments, LEA 470 compares the matching criteria with another field of test loop files 435.

LEA 470 determines whether there is a complete match between the set of matching criteria and one of the test loop database entries. If there is a complete match between a test loop file and the set of matching criteria, LEA 470 accesses a field of the matching test loop file that contains DSL performance information for the test loop, in an embodiment of the invention. If not, LEA 470 performs block 655.

In block 655, LEA 470 determines whether there are more than one test loop files that match the set of matching criteria. If there is no test loop file that matches the set of matching criteria, LEA 470 alters the set of matching criteria to increase the probability that a test loop will match the set of matching criteria at block 660. For example, if the set of matching criteria contains value X, LEA 470 may alter the set of matching criteria to contain the range of values from 1.1*X to 0.9*X at block 660. If more than one test loop file matches the set of matching criteria, LEA 470 alters the set of matching criteria so that fewer test loop files will match the matching criteria at block 665.

LEA 470 compares the altered set of matching criteria with the entries in test loop database 430 at 675. Blocks 640 through 675 are repeated until the set of matching criteria matches one entry in test loop database 430. When LEA 470 determines that one entry of test loop database 430 matches the set of matching criteria, LEA 470 performs block 680. At block 680, LEA 470 retrieves information from the matching database entry about the DSL performance of the test circuit on which the database entry is based. The DSL performance information describes the broadband characteristics of a test loop that has approximately the same characteristics as local loop 445. Other algorithms are considered within the scope of the invention.

In one embodiment of the invention, LEA 470 is embodied as control logic, for example, an ASIC, PLA, FPGA, controller, etc. In another embodiment, LEA 470 is executable content. LEA 470 is stored in a memory subsystem (not shown) of server computing device 420, in an embodiment of the invention.

In an embodiment of the invention, both client loop analyzing agent (CLAA) 414 and loop evaluating agent 470 implement process 600. This embodiment is referred to as the double-ended embodiment of the invention. In the double-ended embodiment of the invention, CLAA 414 accesses memory 518 to obtain modem parameters generated by client modem 510. Also, LEA 470 accesses memory 526 to obtain modem parameters generated by server modem 475. LEA 470 generates a set of matching criteria (server matching criteria) based on parameters extracted from server modem 475 and CLAA 414 generates a set of matching criteria (client matching criteria) based on parameters extracted from client modem 412.

A third set of parameters (difference matching criteria) is generated by calculating the difference between the server matching criteria and the client matching criteria, in an embodiment of the invention. Thus, three sets of parameters are generated in the double-ended embodiment of the invention: server matching criteria, client matching criteria, and difference matching criteria. Test loop data base 430 contains similar information for a large number of test loops in the double-ended embodiment of the invention. Process 600 is implemented for each of the sets of matching criteria, in an embodiment of the invention.

Use of lower bandwidth technology to determine channel capacity for supporting higher bandwidth technology can be controlled by instructions from an electronically accessible medium, which may be used to program a computer (or other electronic devices) to perform a process described herein. The electronically accessible medium may include, but is not limited to, floppy diskettes, optical disks, CD-ROMs, magneto-optical disks, ROMs, RAMs, EPROMs, EEPRPOMs, magnet or optical cards, flash memory, or other type of media/machine-readable medium suitable for storing electronic instructions. Moreover, the instructions may also be downloaded as a computer program product, wherein the program may be transferred from a remote computer to a requesting computer by way of data signals embodied in a carrier wave or other propagation medium via a communication link (e.g., a modem or a network connection).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
   a signal generator to be coupled to a communication channel to generate two or more test signals including a first test signal having a frequency of N times a predetermined frequency and a second test signal having a frequency of (N+1) times the predetermined frequency; and
   a signal analyzer to be coupled to the communication channel to receive signals from the signal generator via the communication channel, the signal analyzer to sample signals on the voice communication channel at frequencies between voice-band frequencies and the test signal frequencies.

2. The system of claim 1 wherein the communication channel is a local loop.

3. The system of claim 2 wherein the signal generator is contained in a digital subscriber line access multiplexer.

4. The system of claim 2 wherein the signal analyzer is contained in a modem.

5. A system to test a local loop comprising:
   a modem having a folded spectrum sampling agent; and
   a signal generator, to generate test signals with frequencies greater than voice-band frequencies, the signal generator to send the test signals to the modem via a local loop, wherein the signal generator generates two or more test signals including a first test signal having a frequency of N times a predetermined frequency and a second test signal having a frequency of(N+1) times the predetermined frequency.

6. The system of claim 5 wherein the folded spectrum sampling agent samples the two or more test signals at twice the predetermined frequency.

7. The system of claim 6 wherein the predetermined frequency is greater than a voice-band frequency range.

8. The system of claim 7 wherein the signal generator is a portable test instrument.

9. The system of claim 7 wherein the signal generator is contained in a digital subscriber line access multiplexer.

10. The system of claim 7 wherein the modem is compliant with the ITU-T Recommendation V.90.

11. A method for testing a local loop comprising:
    establishing a connection between a user modem and a signal generator through a telephone network;
    generating a first test signal with a frequency of N multiplied with a predetermined frequency; and
    generating a second test signal with a frequency of (N+1) multiplied with a predetermined frequency.

12. The method of claim 11, further comprising:
    receiving the test signals at the user modem; and
    employing a folded spectrum sampling agent to fold the one or more test signals into a voice-band frequency range.

13. The method of claim 11 further comprising, sampling the test signals at twice the predetermined frequency.

14. The method of claim 13 further comprising, analyzing the sampled test signals with a digital signal processor.

15. The method of claim 14 further comprising, determining the capacity for the local loop to support broadband services based on the analysis of the sampled test signals.

16. A method of testing a local loop, the method comprising:
    generating a set of modem parameters with a modem;
    accessing a memory of the modem to determine the set of modem parameters;
    creating a set of matching criteria based on the modem parameters;
    comparing the set of matching criteria with one or more entries in a database to determine whether the matching criteria matches an entry in the database, the database entries generated by testing test loops;
    generating a second set of modem parameters with a second modem;
    accessing a memory of the second modem to determine the second set of modem parameters;

creating a second set of matching criteria based on the second set of modem parameters;
comparing the first set of matching criteria with the second set of matching criteria; and
generating a third set of matching criteria based on the comparison of the first set of matching criteria with the second set of matching criteria.

17. The method of claim 16 further comprising, determining the capability of a local loop to support broadband services based on which of the one or more database entries the set of matching criteria matches.

18. The method of claim 17 further comprising:
comparing the second set of matching criteria with the one or more database entries to determine whether the second set of matching criteria matches an entry in the database, the database entries generated by testing test loops.

19. The method of claim 18 further comprising, determining the capability of the local loop to support broadband services based on which of the one or more database entries the second set of matching criteria matches.

20. The method of claim 16 further comprising, comparing the third set of matching criteria with the one or more database entries to determine whether the third set of matching criteria matches an entry in the database, the database entries generated by testing test loops.

21. The method of claim 20 further comprising, determining the capability of the local loop to support broadband services based on which of the one or more database entries the third set of matching criteria matches.

22. A system to test the capability of a local loop to support broadband services, the system comprising:
a modem, to couple with a local loop;
a test loop database, the test loop database containing one or more database entries, the one or more database entries generated by testing test loops; and
a loop evaluation agent, coupled with the modem and the test loop database to determine one or more modem parameters of the modem and to compare the one or more modem parameters with the one or more database entries; and
a signal generator to generate two or more test signals including a first test signal having a frequency of N times a predetermined frequency and a second test signal having a frequency of (N+1) times the predetermined frequently.

23. The system of claim 22 further comprising:
a second modem to couple with the local loop; and
a loop analyzing agent coupled with the second modem, the loop analyzing agent to determine one or more modem parameters of the second modem and to provide the one or more parameters to the loop evaluation agent.

24. The system of claim 23 wherein the first modem and the second modem are compliant with the ITU-T Recommendation V.90.

25. An article of manufacture comprising:
an electronically accessible medium providing instructions, that when executed by one or more processors, cause the one or more processors to
generate a set of modem parameters with a modem;
access a memory of the modem to determine the set of modem parameters;
create a set of matching criteria based on the modem parameters; and
compare the set of matching criteria with one or more entries in a database to determine whether the matching criteria matches an entry in the database, the database entries generated by testing test loops;
generate a second set of modem parameters with a second modem;
access a memory of the second modem to determine the second set of modem parameters;
create a second set of matching criteria based on the second set of modem parameters;
compare the first set of matching criteria with the second set of matching criteria; and
generate a third set of matching criteria based on the comparison of the first set of matching criteria with the second set of matching criteria.

26. The article of manufacture of claim 25, wherein the electronically accessible medium providing instructions, that when executed by one or more processors cause the one or more processors to determine the capability of a local loop to support broadband services based on which of the one or more database entries the set of matching criteria matches.

27. The article of manufacture of claim 26, wherein the electronically accessible medium providing instructions, that when executed by one or more processors cause the one or more processors to
compare the second set of matching criteria with the one or more database entries to determine whether the matching criteria matches an entry in the database, the database entries generated by testing test loops; and
determine the capability of the local loop to support broadband services based on which of the one or more database entries the second set of matching criteria matches.

* * * * *